United States Patent
Downard (10) Patent No.: US 7,484,951 B2
(45) Date of Patent: Feb. 3, 2009

(54) INJECTION MOLDING SYSTEM WITH PART POSITIONING JIG AND PICK AND PLACE TOOL

(75) Inventor: Evan Downard, Hailey, ID (US)

(73) Assignee: Tooling Express, Bellevue, ID (US)

( * ) Notice: Subject to any disclaimer, the term of this patent is extended or adjusted under 35 U.S.C. 154(b) by 265 days.

(21) Appl. No.: 11/253,926

(22) Filed: Oct. 18, 2005

(65) Prior Publication Data

US 2007/0087077 A1 Apr. 19, 2007

(51) Int. Cl.
B29C 45/03 (2006.01)
B29C 45/17 (2006.01)
B65G 47/90 (2006.01)

(52) U.S. Cl. .............. 425/444; 425/436 RM; 414/751.1; 414/783; 414/816

(58) Field of Classification Search .......... 425/436 RM, 425/444, 436 R; 414/735, 732, 749.1, 751.1, 414/783, 787, 808, 816
See application file for complete search history.

(56) References Cited

U.S. PATENT DOCUMENTS

| | | | |
|---|---|---|---|
| 2,969,544 A * | 1/1961 | Di Marco et al. | 343/912 |
| 4,581,193 A | 4/1986 | Lesley | 264/500 |
| 4,610,619 A | 9/1986 | Lesley | 425/388 |
| 4,834,358 A | 5/1989 | Okolischan et al. | 269/309 |
| 4,850,780 A * | 7/1989 | Safabakhsh et al. | 414/416.1 |
| 5,256,128 A * | 10/1993 | Neumann | 483/1 |
| 5,280,893 A | 1/1994 | Sixtensson | 269/154 |
| 5,431,554 A | 7/1995 | Yoshida et al. | 425/183 |
| 5,619,940 A | 4/1997 | Moriguchi | 112/27 |
| 5,715,167 A | 2/1998 | Gupta et al. | 364/474.28 |
| 6,190,115 B1 * | 2/2001 | Suzuki et al. | 414/752.1 |
| 6,283,693 B1 * | 9/2001 | Acello et al. | 414/403 |
| 6,695,369 B2 * | 2/2004 | Schmidt et al. | 294/1.1 |
| 6,722,875 B2 | 4/2004 | Ralph et al. | 425/576 |
| 7,104,780 B2 * | 9/2006 | Domodossola et al. | 425/534 |
| 2003/0152661 A1 * | 8/2003 | Yu et al. | 425/436 RM |
| 2003/0160362 A1 * | 8/2003 | Fithian | 264/328.12 |
| 2006/0182603 A1 * | 8/2006 | Hawes | 414/735 |

* cited by examiner

*Primary Examiner*—Yogendra Gupta
*Assistant Examiner*—Emmanuel S Luk
(74) *Attorney, Agent, or Firm*—Holland Law Office, PLLC (57) ABSTRACT

A pick and place tool including a part penetration element adapted to induce a generation of a compressive force by the part against the part penetration element, securing the part to the part penetration element. The pick and place tool secures a part at first location employing an induced compressive force by the part against a part penetration element of the pick and place tool. In one embodiment, a pick and place tool for picking a part while maintaining a selected part orientation includes a tool body and a part penetration element attached to the tool body, the part penetration element adapted to induce a compressive force by the part against the part penetration element, securing the part to the part penetration element in a selected part orientation.

8 Claims, 7 Drawing Sheets

INJECTION MOLDING SYSTEM WITH PART POSITIONING JIG AND PICK AND PLACE TOOL

BACKGROUND OF THE INVENTION

1. Technical Field

The present invention relates generally to plastic injection molding and more particularly to a positioning jig and pick and place tooling for an injection molding device and process.

2. Background

In the field of plastic molding, it is well known that a plastic component may be molded to a non-plastic element. For instance, in one application, a plastic connector is molded to a fabric strap to provide a means for attaching the strap to yet another component or part, or for connecting two molded connecting buckle ends to one another, for instance, to be used as a belt.

According to the prior art, positioning a part with respect to a mold, may be achieved by positioning a portion of the part to which a plastic element is to be molded, in a detent or recessed portion of a first mold section or mold insert. According to the prior art, once a part that is to be attached to the molded component is positioned on the mold insert, the mold insert must be handled rather delicately, until the insert is mated with the a second mold section pinching or compressing the part between the mold insert and the second mold section. In practice, the mold section to upon which the part that is to be attached to the molded component is positioned typically remains in a horizontal position until the molding process is complete.

The described process or methodology provides distinct limitations particularly when considering the use of vertical injection molding devices and processes or various tooling for automated settings. Maintaining the location of the part with respect to the mold insert in production settings has proven challenging. Because of the orientation of the mold, parts are prone to shifting and displacement during the course of the process. Additionally, placing parts to which a component is to be molded is similarly challenging, particularly in a production setting.

Advantage may be found therefore in providing a plastic injection molding system that includes a device for positively locating a part to which a plastic element is to be molded with respect to the mold. Additional advantage may be found in providing a plastic injection molding system that includes a positioning jig for accurately locating and positioning a part to which a plastic element is to be molded, in a selected orientation for subsequent placement in a mold section. Additional advantage may be found in providing a pick and place tool adapted to pick the part to which a plastic element is to be molded from the positioning jig and accurately transport the part to a mold section, accurately placing the part with respect to the mold section in the selected orientation. Additional advantage may be found in providing a pick and place tool adapted to pick the part to which a plastic element is to be molded from the positioning jig and transport the part to the mold, accurately placing the part in a selected orientation for a subsequent molding process. Additional advantage may be found in providing a mold section having a face oriented in a substantially vertical plane that is adapted to receive a part to which a plastic element is to be molded, accurately maintaining a selected orientation for a subsequent molding process until the injection molding process has been completed.

An objective of the present invention therefore is to provide a plastic injection molding system that includes a device that positions a part to which a plastic element is to be molded in a selected position with respect to the mold. An additional objective of the present invention is providing a plastic injection molding system that includes a positioning jig for accurately positioning a part to which a plastic element is to be molded, for subsequent placement in a mold section. An additional objective of the present invention is providing a pick and place tool adapted to pick the part to which a plastic element is to be molded from the positioning jig and transport the part to the mold, accurately positioning the part in the mold maintaining the selected position of the part. An additional objective of the present invention is providing a mold section adapted to receive a part to which a plastic element is to be molded, accurately maintaining the selected position of the part until the injection molding process has been completed.

These and other objectives of the present invention are provided by the various embodiments of the invention disclosed herein and by other embodiments that will or may fall within the claimed scope of the present invention as set forth in the appended claims.

SUMMARY OF THE INVENTION

The present invention is directed to a pick and place tool including a part penetration element adapted to induce a compressive force by the part against the part penetration element, securing the part to the part penetration element. The pick and place tool secures a part at first location employing an induced compressive force by the part against a part penetration element of the pick and place tool.

The present invention is also directed to an injection molding system that includes an injection molding device including a pick and place tool having a first part penetration element adapted to induce a compressive force by the part against the first part penetration element, securing the part to the part penetration element. The injection molding system may also include a positioning jig for positioning a part to which a plastic component is to be molded in a selected position. Employing the compressive force induced in the part against the first part penetration element, the pick and place tool picks the part from a positioning jig and transports the part to a mold section of the injection molding device and releases the part to the mold section. Transport of the pick and place tool part with the attached part is accomplished by a pick and place tool transport means attached to the pick and place tool. The pick and place tool transport means may be accomplished either manually or by well known automated means. In the preferred embodiment of the invention, the mold section includes a second part penetration element adapted to induce a compressive force by the part against the second part penetration element. The pick and place tool also includes a part release system adapted to release the part from the first part penetration element of the pick and place tool to the second part penetration element of the mold section.

The present invention is also directed to a method for picking a part with a pick and place tool including a first part penetration element adapted to induce a generation of a compressive force by the part against the part penetration element, securing the part to the part penetration element. The method includes securing a part by the first part penetration element at first location employing an induced compressive force by the part against a part penetration element of the pick and place tool and transporting the part to a second location. The method may also include transferring the part from the pick and place tool to a second part penetration element at the second location.

Additional advantages and novel features of the invention will be set forth in part in the description that follows, and in part will become apparent to those skilled in the art upon examination of the following, or may be learned by practice of the invention. Additionally, the advantages of the invention may be realized and attained by means of the instrumentalities and combinations particularly pointed out in the appended claims.

DETAILED DESCRIPTION OF THE INVENTION

Figure 1:
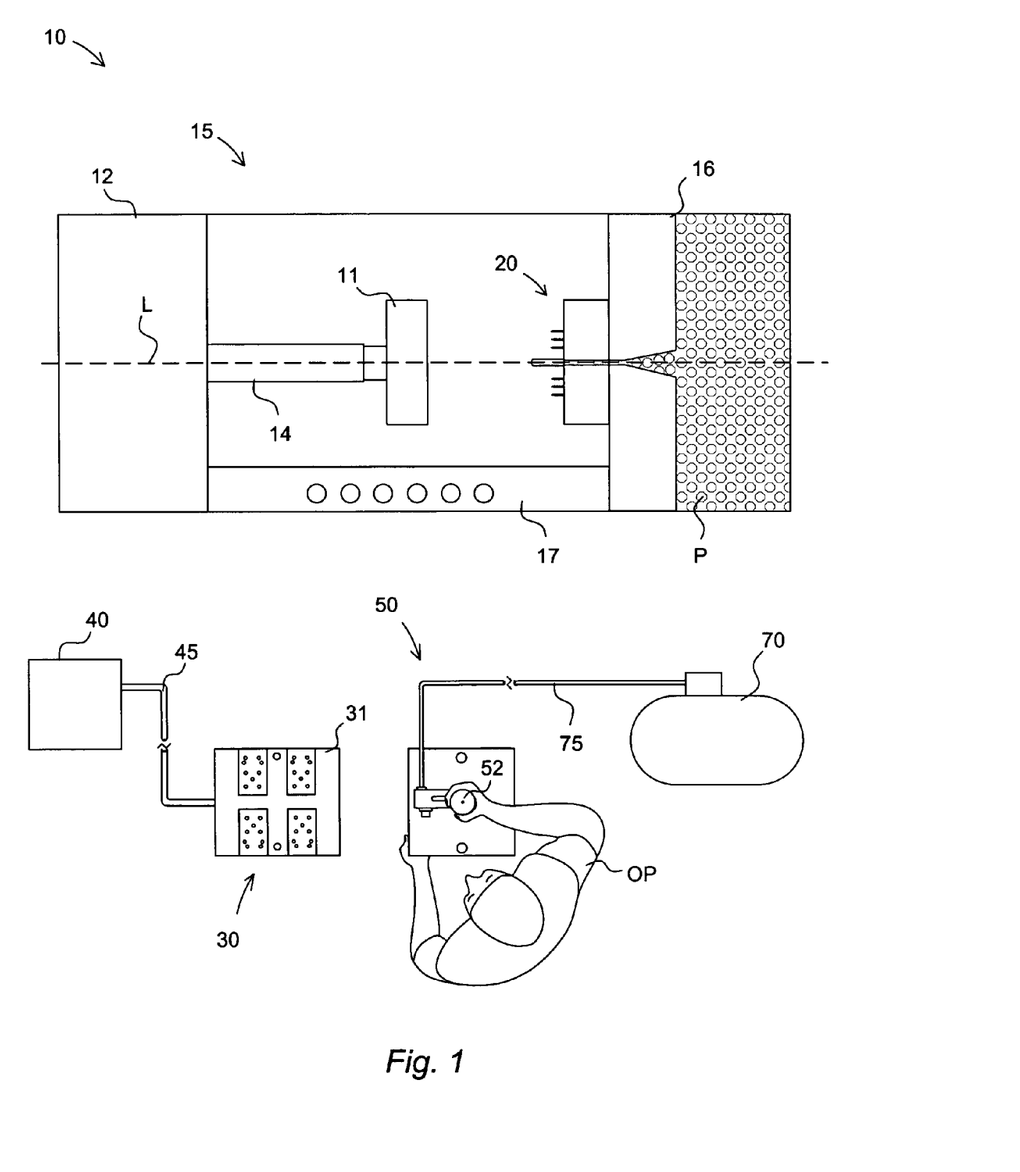
FIG. 1 is a schematic representation of a plastic injection molding system according to the present invention.

Referring to FIG. 1 injection molding system 10 includes injection molding device 15, positioning jig 30 and pick and place tool 50. Injection molding device 15 includes stationary first mold section 20 positioned in opposing relationship to moveable second mold section 11. Moveable second mold section 11 is extendable and retractable along line L against stationary first mold section 20 by operation of ram 14. Pressurized fluid system 12 provides necessary fluid power for operation of ram 14. As shown FIG. 1, stationary first mold section 20 is fluidly connected to plastic injection system 16 by conduit 19. Plastic injection system 16 is adapted to inject plastic P into stationary first mold section 20 and moveable second mold section 11, when the respective sections are in contact. Control system 17 provides necessary control for operation of injection molding device 15.

As shown FIG. 1, positioning jig 30 includes jig platen 31 which is fluidly connected to vacuum system 40 through vacuum tube 45. Vacuum system 40 provides a negative pressure at an upper surface of jig platen 31. Pick and place tool 50 is fluidly connected to compressor 70 through air line 75, which provides compressed air for operation of actuator 52. As shown in FIG. 1, operator OP provides transport means for movement of pick and place tool 50 between positioning jig 30 and stationary first mold section 20.

Figure 2:
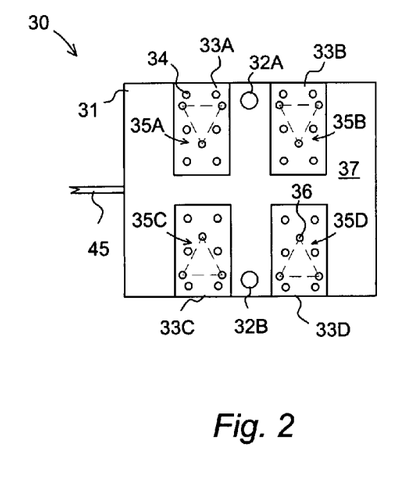
FIG. 2 is a representative top view of a positioning jig according to the present invention.
Figure 3:
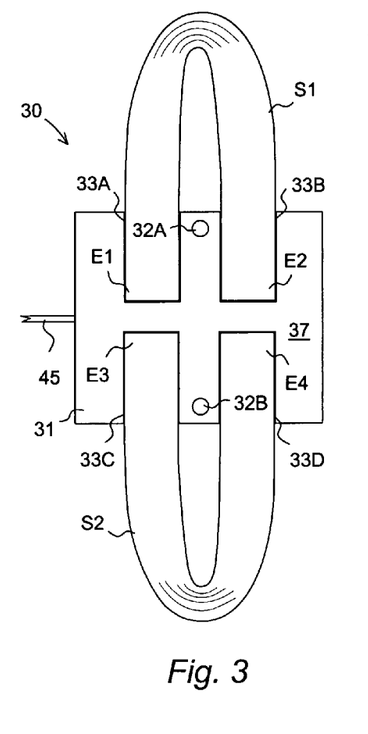
FIG. 3 is a representative top view of a positioning jig, having a part positioned on an upper face according to the present invention.

Referring to FIGS. 2 and 3, positioning jig 30 is shown in greater detail. Positioning jig 30 includes jig platen 31 having platen surface 37. A plurality of positioning detents 33A, 33B, 33C and 33D are formed on platen surface 37. Alignment studs 32A and 32B provide a means for aligning a pick and place tool with positioning jig 30 as discussed herein below. As shown in FIG. 2, a plurality of vacuum passages, typified in FIG. 2 by vacuum passage 34, are fluidly connected to vacuum tube 45 and provide negative air pressure at positioning detents 33A, 33B, 33C and 33D for aiding in the initial placement of a part, (not shown), in the positioning detents 33A, 33B, 33C and 33D. FIG. 2 also shows a plurality of jig pin receiving apertures forming a plurality of jig pin receiving aperture arrays, indicated by the by the dashed triangles, 35A, 35B, 35C and 35D, each jig pin receiving aperture array including, in this case, three distinct jig pin receiving apertures, each typified by jig pin receiving aperture 36. In other embodiments, the jig pin receiving aperture arrays may include any arrangement of two or more jig pin receiving apertures.

Referring to FIG. 3, positioning jig 30 is shown with two parts positioned for picking, in the case strap S1 and strap S2. More particularly, ends E1 and E2 are shown positioned in positioning detents 33A and 33B respectively and ends E3 and E4 are positioned in positioning detents 33C and 33D respectively. Vacuum tube 45 is shown connected to jig platen 31.

Figure 4:
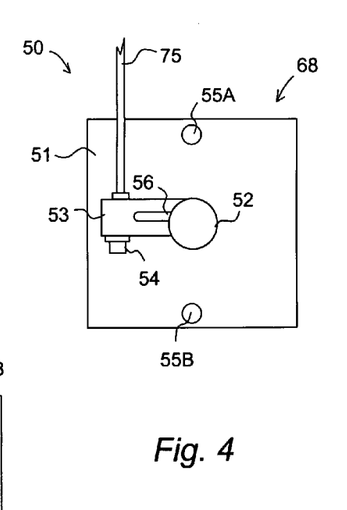
FIG. 4 is a representative top view of a pick and place tool according to the present invention.
Figure 7:
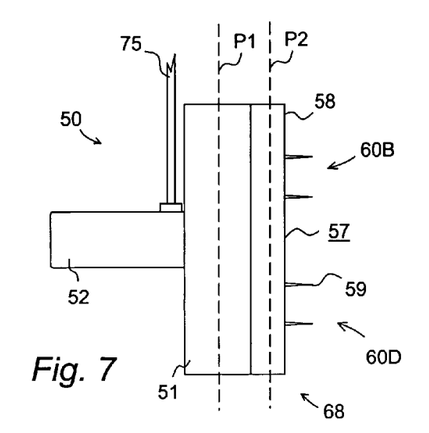
FIG. 7 is a representative side view of a pick and place tool according to the present invention.
Figure 8:
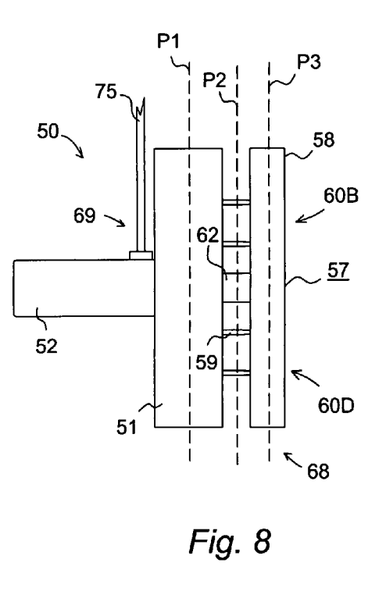
FIG. 8 is a representative side view of a pick and place tool according to the present invention.
Figure 9:
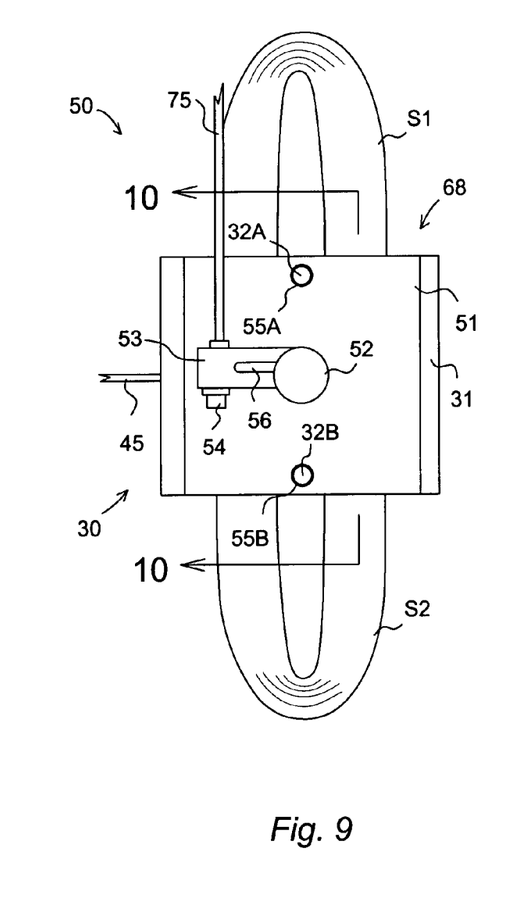
FIG. 9 is a representative top view of a pick and place tool positioned above a positioning jig according to the present invention.
Figure 14:
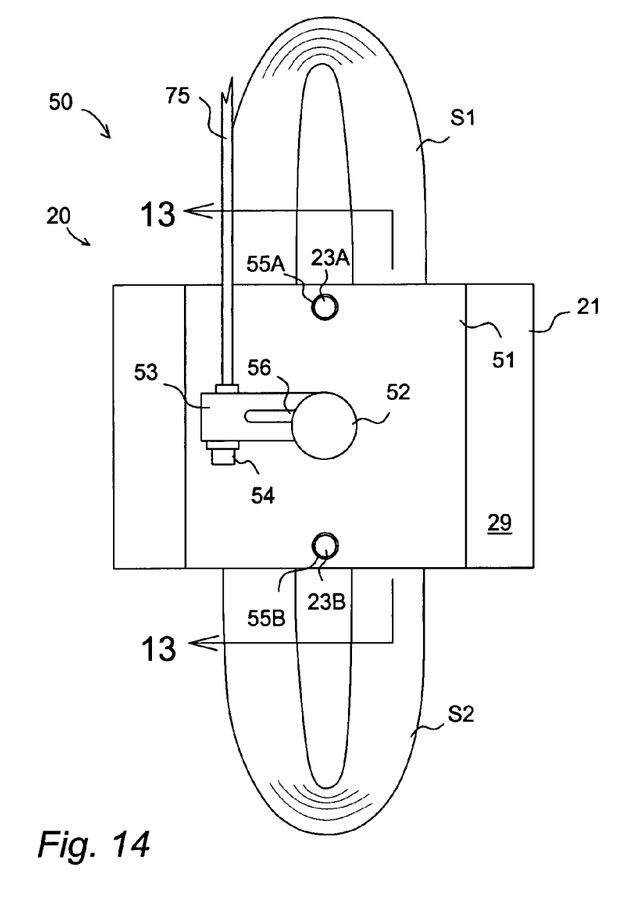
FIG. 14 is a representative top view of a pick and place tool positioned against a mold section according to the present invention.

Referring to FIGS. 4, 5 and 7-10, 12 and 14-16, various features of pick and place tool 50 are shown in greater detail. As shown, pick and place tool 50 includes tool body 68 having first tool body element 51, shown in FIGS. 4, 7-12 and 14-16, to which pneumatic actuator 52 is mounted. FIGS. 5-8, 10-12 and 15-16 show second body element 58 of tool body 68. FIGS. 4, 9 and 14, show pneumatic valve 53 connected to pneumatic actuator 52. Pneumatic valve 53 includes actuator operator 54, which upon operation permits a flow of pressurized air through bypass 56 into pneumatic actuator 52. FIGS. 4, 5, 7-10, and 14-16 show air line 75 connected to pneumatic valve 53. FIGS. 4, 5, 9, 12 and 14 show alignment apertures 55A and 55B, which facilitate alignment of pick and place tool 50 with both positioning jig 30 as shown in FIG. 9, and with stationary first mold section 20, as shown in FIG. 14, and as discussed herein below.

Figure 5:
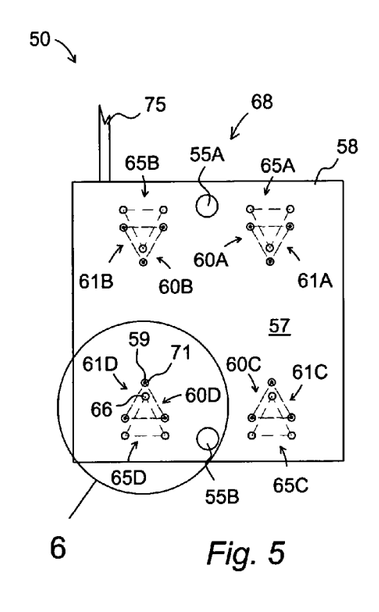
FIG. 5 is a representative bottom view of a pick and place tool according to the present invention.

Referring to FIG. 5, pick and place tool 50 is shown in a bottom view. From this perspective, lower plate 58 is shown including a plurality of penetration elements located on bottom face 57. Each penetration element includes a pick and place tool pin array indicated by the dashed triangles, 60A, 60B, 60C and 60D, each pick and place tool pin array including, in this case, three pins, typified by pin 59. Each pin of pick and place tool pin arrays 60A, 60B, 60C and 60D extends through lower plate 58 in one of a plurality of pin sheath apertures. The plurality of pin sheath apertures form pin sheath aperture arrays indicated by the dashed triangles 61A, 61B, 61C and 610D, each pin sheath aperture typified in FIG. 5 by pin sheath aperture 71. Lower plate 58 also includes a plurality of mold pin receiving aperture arrays, shown by the by the dashed triangles, 65A, 65B, 65C and 65D, each mold pin receiving aperture array including, in this case, by three distinct mold pin receiving apertures, each typified by mold pin receiving aperture 66. FIG. 5 also shows alignment apertures 55A and 55B, which facilitate alignment of pick and place tool 50 with both positioning jig 30 as shown in FIG. 9, and with stationary first mold section 20, as shown in FIG. 14, and as discussed herein below.

Figure 6:
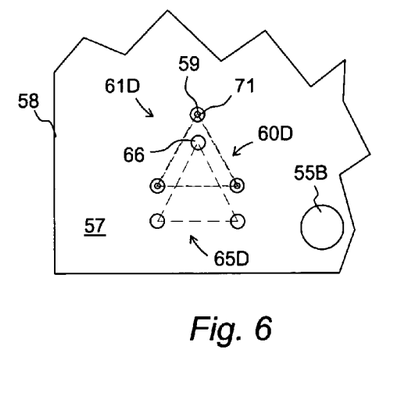
FIG. 6 is a representative detail bottom view of a pick and place tool according to the present invention.

FIG. 6 is a bottom view detail showing that part of bottom face 57 of lower plate 58 that includes pick and place tool pin array 60D including three pins, each pin typified in FIG. 6 by pin 59. As shown in FIG. 6, each pin of pick and place tool pin array 60D extends through a pin sheath aperture, the plurality of pin sheath apertures forming pin sheath aperture array 610D. FIG. 6 also shows mold pin receiving aperture array 65D including, in this case, three distinct mold pin receiving apertures, each of the mold pin receiving apertures typified in FIG. 6 by mold pin receiving aperture 66. FIG. 6 also shows alignment aperture 55B located on bottom face 57 of lower plate 58.

Referring to FIGS. 7 and 8, pick and place tool 50 is shown in a side view. As shown, pick and place tool 50 includes tool body 68 including first tool body element 51 lying substantially in a first plane P1 and second tool body element 58 lying substantially in a second plane P2. The pins of pick and place tool pin arrays 60B and 60D, typified in FIGS. 7 and 8 by pin 59, are shown extending through lower plate 58. Referring to FIG. 7, first tool body element 51 and second tool body element 58 are in contact and as shown and pick and place tool pin arrays 60B and 60D are exposed. As shown in FIG. 8, operation of part release system 69 is demonstrated. When pneumatic actuator 52 is energized, displaceable rod 62 extends displacing second tool body element 58 with respect to first tool body element 51, to third plane P3.

Figure 10:
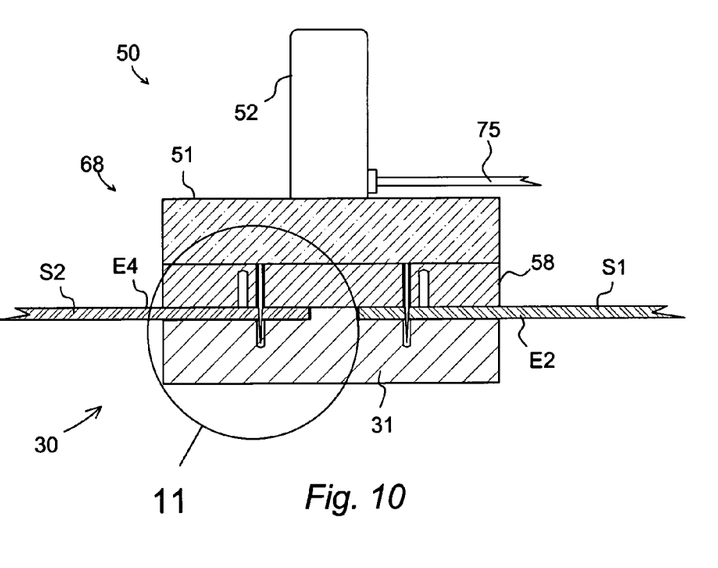
FIG. 10 is a representative side cutaway view of a pick and place tool positioned on an upper face of positioning jig according to the present invention.

Referring to FIGS. 9 and 10, pick and place tool 50 is shown positioned on top of jig platen 31 of positioning jig 30. As shown in FIG. 9, pick and place tool 50 is aligned with respect to positioning jig 30 by insertion of alignment studs 32A and 32B through alignment apertures 55A and 55B. The end portions of straps S1 and S2, (not shown in FIG. 9), are positioned between pick and place tool 50 and positioning jig 30. FIG. 9 shows vacuum tube 45 pneumatically connected to jig platen 31. Referring to FIG. 10, pick and place tool 50 is shown including tool body 68 having first tool body element 51 and second tool body element 58. End E2 of strap Si and end E4 of strap S2 are shown disposed between second tool body element 58 and jig platen 31.

Figure 11:
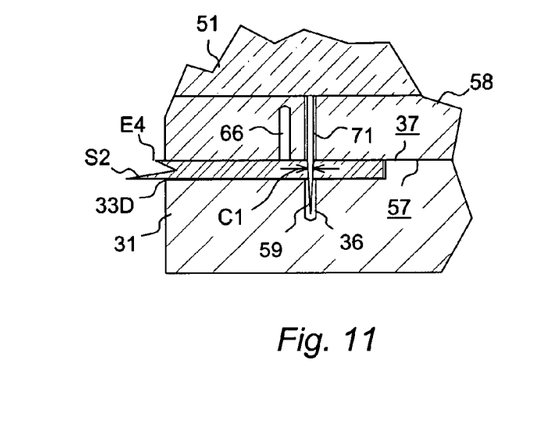
FIG. 11 is a representative detail side cutaway view of a pick and place tool positioned on an upper face of positioning jig according to the present invention.

FIG. 11 shows a detail side cutaway view of end E4 of strap S2 positioned in positioning detent 33D between bottom face 57 of second tool body element 58 of pick and place tool 50 and against upper face 37 of jig platen 31 of positioning jig 30. As pick and place tool 50 is pressed against jig platen 31, each pin of the pick and place tool pin arrays 60A, 60B, 60C and 60D, (shown in FIG. 5), and typified in FIG. 11 by pin 59, pierces through end E4 of strap S2, entering jig pin receiving aperture 36, one of the jig pin receiving apertures forming the plurality of jig pin receiving aperture arrays, 35A, 35B, 35C and 35D, (shown in FIG. 2). As each pin pierces through the strap, a compressive force is induced in the strap about each pin. With specific reference to FIG. 11, by way of illustration, as pin 59 is forced through end E4 of strap S2, projecting into jig pin receiving aperture 36, first compressive force C1 is induced in strap S2 against pin 59. FIG. 11 also shows pin 59 attached to first tool body element 51 and extending through pin sheath aperture 71, typical of the plurality of pin sheath apertures forming the pin sheath aperture arrays 61A, 61B, 61C and 61OD, (shown in FIG. 5). Also shown in FIG. 11 is mold pin receiving aperture 66.

Figure 12:
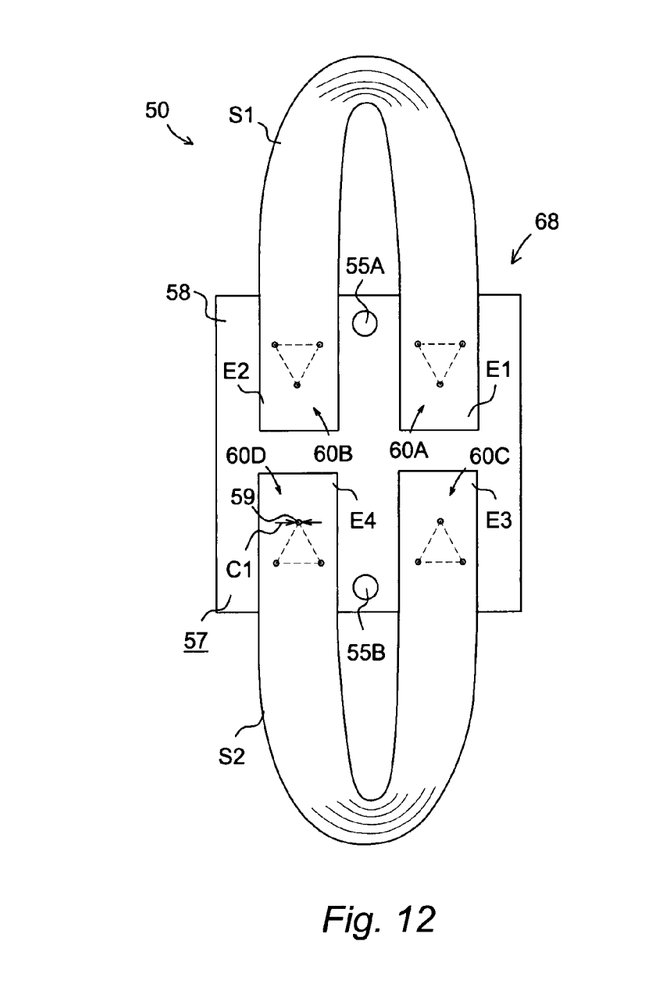
FIG. 12 is a representative bottom view of a pick and place tool according to the present invention.

FIG. 12 shows strap S1 and S2 positioned against bottom face 57 of second tool body element 58 of pick and place tool 50. As shown, end E1 of strap S1 is held in position by pick and place tool pin array 60A and end E2 of strap S1 is held in position by pick and place tool pin array 60B. Similarly, end E3 of strap S2 is held in position by pick and place tool pin array 60C and end E4 of strap S2 is held in position by pick and place tool pin array 60D. Compressive force C1 is induced in straps S1 and S2 against the pins of pick and place tool pin arrays 60A, 60B, 60C and 60D, each pin typified by pin 59, at the location at which the pins penetrate the straps. Also shown in FIG. 12 are alignment apertures 55A and 55B.

Figure 13:
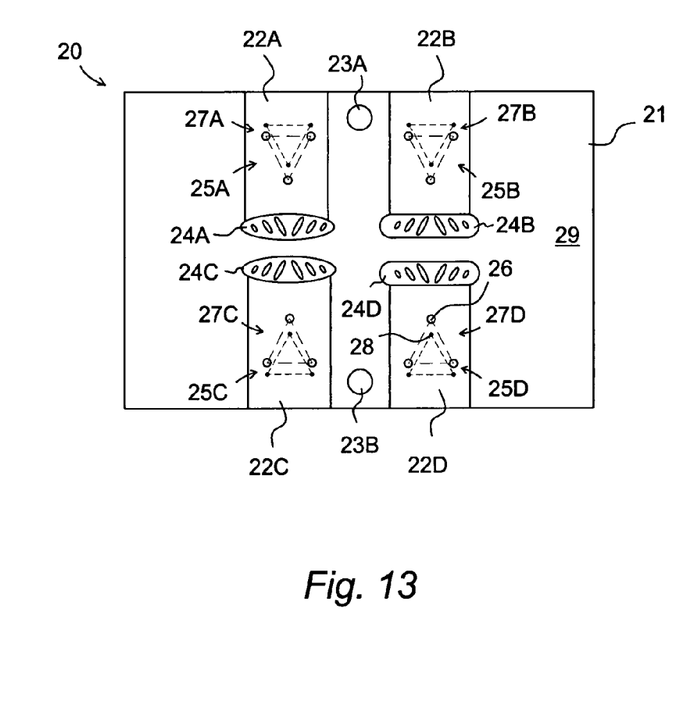
FIG. 13 is a representative front view of a mold section adapted to receive a part from the pick and place tool according to the present invention.
Figure 17:
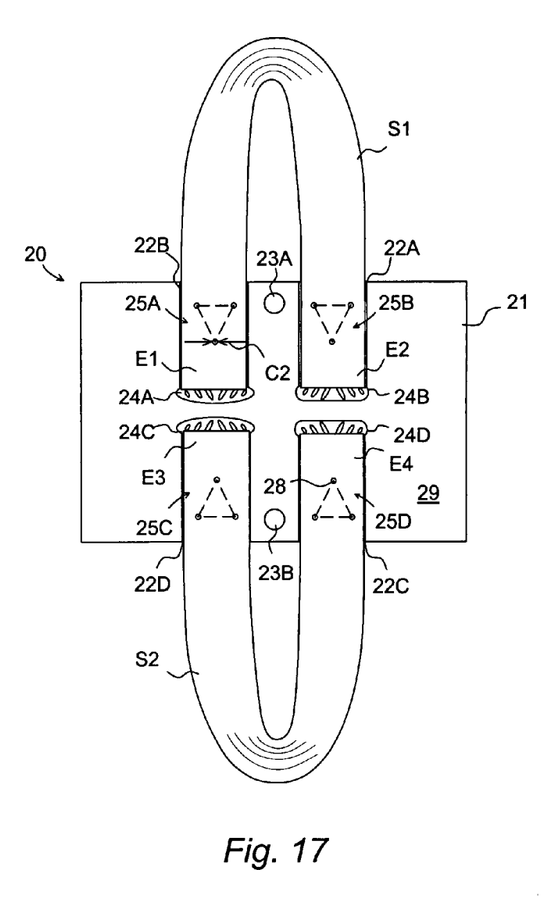
FIG. 17 is a representative front view of a mold section according to the present invention.

FIGS. 13 and 17 show stationary first mold section 20 for molding a plastic element at each end of a pair of straps S1 and S2 as shown in FIG. 17. FIGS. 13, 14 and 17 show stationary first mold section 20 including first mold plate 21 having face 29. FIGS. 13 and 17 show face 29 including a plurality of part positioning detents 22A, 22B, 22C and 22D, which provide locations at which parts are to be positioned.

Contiguous to each of the part positioning detents 22A, 22B, 22C and 22D are mold cavities 24A, 24B, 24C and 24D respectively. First mold plate 21 includes a plurality of mold section penetration elements located on face 29. Each mold section penetration element includes a mold section pin array indicated by the by the dashed triangles, 25A, 25B, 25C and 25D, each mold section pin array including, in this case, three pins, typified in FIGS. 13 and 17 by pin 28. Referring to FIG. 13, first mold plate 21 also includes a plurality of pick-up pin receiving aperture arrays, shown by the by the dashed triangles, 27A, 27B, 27C and 27D, each mold pin receiving aperture array including in this case by three distinct pick-up pin receiving apertures, each typified in FIG. 13 by pick-up pin receiving aperture 26. FIGS. 13 and 17 show alignment studs 23A and 23B, which provide a means for aligning pick and place tool 50, as shown in FIGS. 14-16, with stationary first mold section 20 as discussed herein below.

Figure 15:
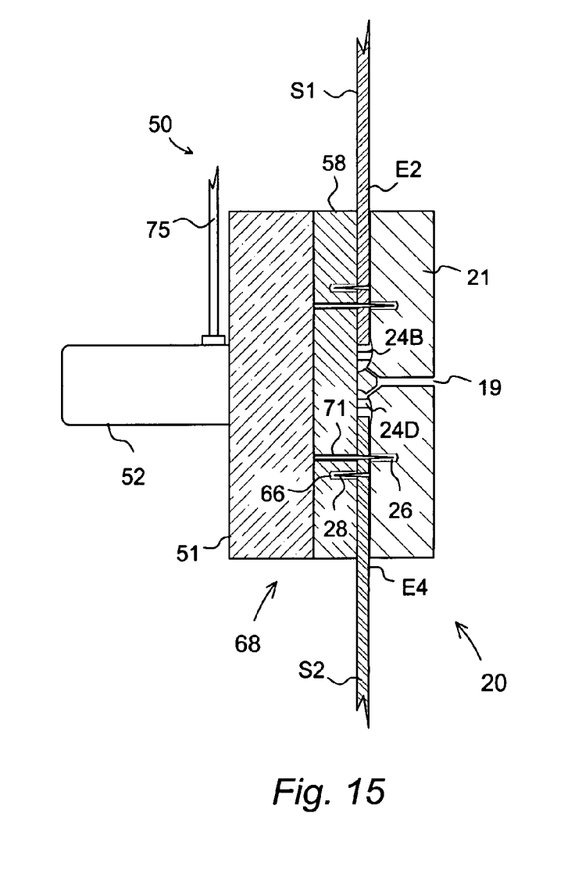
FIG. 15 is a representative side cutaway view of a pick and place tool positioned against a mold section according to the present invention.

Referring to FIGS. 14 and 15, pick and place tool 50 is shown positioned in an interfacing relation against face 29 of first mold plate 21. As shown in FIG. 14, pick and place tool 50 is aligned with respect to first mold plate 21 of stationary first mold section 20 by insertion of alignment studs 23A and 23B through alignment apertures 55A and 55B. Straps S1 and S2 are positioned partially between pick and place tool 50 and first mold plate 21. FIGS. 15 and 16 show, end E2 of strap S1 and end E4 of strap S2 disposed between second tool body element 58 and first mold plate 21 with ends E2 and E4 extending into mold cavities 24B and 24D respectively.

As pick and place tool 50 is pressed against first mold plate 21, each pin of the pick and place tool pin arrays 60A, 60B, 60C and 60D, (shown in FIG. 5), typified in FIG. 15 by pin 59, pierces through the strap section entering one of the pick-up pin receiving apertures, 27A, 27B, 27C and 27D, (shown in FIG. 13), each pick-up pin receiving aperture typified in FIG. 15 by pick-up pin receiving aperture 26, shown in FIG. 15. At the same time, as pick and place tool 50 is pressed against first mold plate 21, each pin of the mold section pin arrays 25A, 25B, 25C and 25D, (shown in FIG. 13), typified in FIG. 15 by pin 28, pierces through the strap section entering one of the mold pin receiving apertures of the mold pin receiving aperture arrays 65A, 65B, 65C and 65D, (shown in FIG. 5), each mold pin receiving aperture typified in FIG. 15 by mold pin receiving aperture 66. With specific reference to FIG. 15, and by way of illustration, as pin 59 pierces end E4 of strap S2 it projects into pick-up pin receiving aperture 26. Similarly, as pin 28, pierces end E4 of strap S2 it projects into mold pin receiving aperture 66. FIG. 15 also shows pin 59 attached to first tool body element 51 and extending through pin sheath aperture 71. Also shown in FIG. 11 is mold pin receiving aperture 66.

Figure 16:
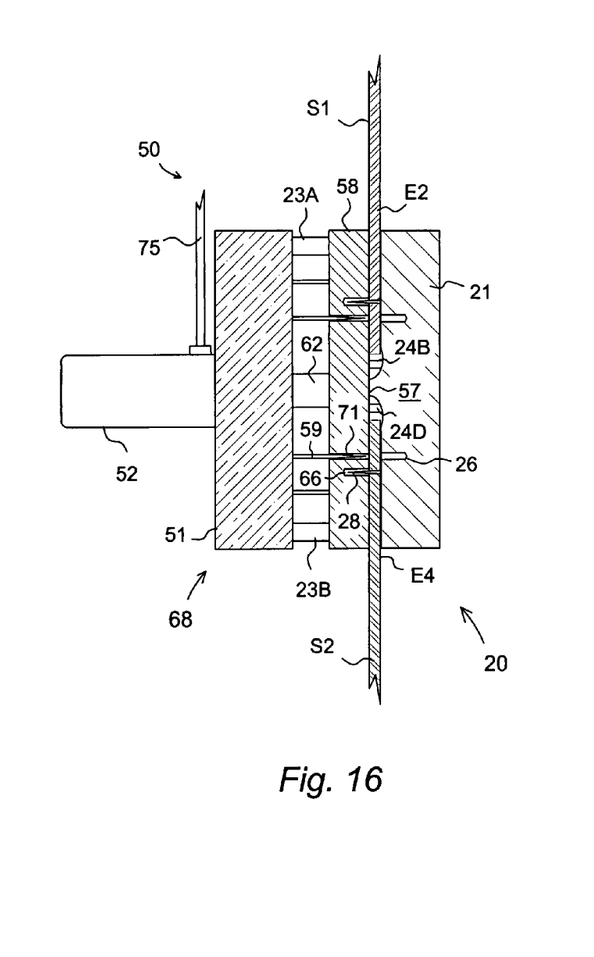
FIG. 16 is a representative side cutaway view of a pick and place tool positioned against a mold section according to the present invention.

Referring to FIG. 16, once strap S1 and S2 are positioned as shown in FIG. 15, actuator 52 of pick and place tool 50 is energized extending displaceable rod 62 thereby displacing second tool body element 58 of tool body 68 with respect to first tool body element 51. As second tool body element 58 is displaced, each pin sheath aperture of the pin sheath aperture arrays 61A, 61B, 61C and 610D, (shown in FIG. 5), typified in FIG. 15 by pin sheath aperture 71 extends over the pin of the pick and place tool pin arrays 60A, 60B, 60C and 60D, (shown in FIG. 5), typified in FIG. 15 by pin 59, associated with a particular pin sheath aperture, releasing straps S1 and S2 from the pick and place tool pin arrays 60A, 60B, 60C and 60D, (shown in FIG. 5). FIG. 16 shows alignment studs 23A and 23B, which are exposed when second tool body element 58 is displaced with respect to first tool body element 51. With specific reference to FIG. 16, and by way of illustration, as second tool body element 58 is displaced with respect to first tool body element 51 of tool body 68 by displaceable rod 62, pin sheath aperture 71 extends with respect to pin 59, releasing end E4 of strap S2 from pick and place tool 50. When pick and place tool 50 is moved away from first mold plate 21, and referring to FIG. 17, ends E1-E4 of straps S1 and S2 remain supported by mold section pin arrays 25A, 25B, 25C and 25D, (shown in FIG. 13), each pin being typified in FIG. 17 by pin 28 which is shown projecting into mold pin receiving aperture 66.

Referring again to FIG. 1, once pick and place tool 50 is moved away from stationary first mold section 20, operation and extension of moveable second mold section 11 is initiated by operation of pressurized fluid system 12 and ram 14. Once moveable second mold section 11 and stationary first mold section 20 are in contact, plastic injection system 16 is energized and, referring to FIGS. 1 and 15, molten plastic, (not shown), is injected through conduit 19 to the mold cavities 24A, 24B, 24C and 24D, seen in FIG. 13. Following injection, and referring again to FIG. 1, ram 14 retracts and moveable second mold section 11 is separated from stationary first mold section 20.

It is to be understood that the invention is not limited to the embodiment shown and described above. It will be appreciated for instance that the transport means for movement of pick and place tool 50 between positioning jig 30 and stationary first mold section 20 may include other means known to those skilled in the art including robotics or other mechanized means. Similarly, where FIG. 1 depicts a single positioning jig 30 it will be appreciated that two or more positioning jigs may be positioned about a turntable that allows parts to be placed of a positioning jig at a first station while pick and place tool 50 is picking from another positioning jig located a second station accessible for instance by a robot. Additionally, while the specification and figures discuss a preferred embodiment wherein a part is transferred onto a stationary first mold section 20 by pick and place tool 50, it is conceivable that embodiments may exist wherein a part is transferred onto a movable mold section by pick and place tool 50. Various other embodiments of the invention may be made and practiced without departing from the scope of the invention, as defined in the following claims.

What is claimed is:

1. A pick and place tool for picking and placing a fabric in a selected orientation, the pick and place tool comprising:
    a tool body including a first tool body element and a second tool body element;
    a pick and place tool pin array including a plurality of pins attached to and extending from the first tool body element, a compressive force induced by the fabric against each of the plurality of pins, securing the piece of fabric to the tool body and the plurality of pins in the selected orientation; and
    a fabric release system including an actuator connected between the first tool body element and the second tool body element, the actuator selectively energizeable to displace second tool body element relative to first tool body element and the plurality of pins displacing the fabric from the plurality of pins.

2. The pick and place tool of claim 1 the tool body farther comprising an alignment element for aligning the tool body with a mold section.

3. The pick and place tool of claim 1 further comprising a pick and place tool transport means attached to the pick and place tool.

4. An injection molding system for molding a plastic element to a fabric, the injection molding system comprising:
    a stationary first mold section including a part positioning detent;
    a second mold section moveable relative to the first mold section;
    an advance mechanism connected to the second mold section for moving the second mold section relative to the stationary first mold section;
    a plastic injection system fluidly connected to the stationary first mold section for injecting a molding material through the stationary first mold section;
    a pick and place tool for picking a piece of fabric, the pick and place tool including a tool body having a first tool body element and a second tool body element and a pick and place tool pin array including a plurality of pins attached to and extending from the first tool body element through a plurality of apertures formed in the second tool body element, each of the plurality of pins adapted to penetrate the fabric, a compressive force induced by the fabric against each of the plurality of pins, securing the fabric to the tool body in a selected orientation; and
    a mold section pin array attached to the stationary first mold section the mold section pin array adapted to receive the fabric from the pick and place tool.

5. The injection molding system of claim 4 further comprising:
    a positioning jig including a positioning element, the positioning jig adapted to pre-position the fabric for pickup by the pick and place tool in the selected orientation; and
    the pick and place tool adapted to pick the fabric from the positioning jig maintaining the selected orientation.

6. The injection molding system of claim 4 wherein the pick and place tool further comprises a release system adapted to release the fabric from the pick and place tool pin array.

7. The injection molding system of claim 4 wherein the pick and place tool further comprises a pick and place tool transport means attached to the pick and place tool.

8. The injection molding system of claim 4 wherein the pick and place tool farther comprises:
    the first tool body element lying substantially in a first plane, the second tool body element lying in a second plane, the second plane lying substantially parallel to the first plane, the second tool body element including a plurality of apertures projecting through the second tool body element on axes lying substantially perpendicular to the second plane, each of the plurality of pins of the pick and place tool pin array projecting through one of the plurality of pin apertures; and a fabric release system including an actuator attached to the first tool body element, the actuator including a displaceable member attached between the actuator and the second tool body element, the second tool body element displaceable by operation of the actuator to release the fabric from the pick and place tool pin array.

* * * * *